United States Patent [19]

Inaba et al.

[11] Patent Number: 4,466,769
[45] Date of Patent: Aug. 21, 1984

[54] INDUSTRIAL ROBOT

[75] Inventors: Hajimu Inaba; Seiichiro Nakajima, both of Hino; Shigemi Inagaki, Musashino; Susumu Ito, Hino, all of Japan

[73] Assignee: Fujitsu Fanuc Limited, Tokyo, Japan

[21] Appl. No.: 389,882

[22] Filed: Jun. 18, 1982

[30] Foreign Application Priority Data

Jun. 29, 1981 [JP] Japan ................................ 56-099740

[51] Int. Cl.³ ............................................ B66C 23/00
[52] U.S. Cl. ................................ 414/744 R; 414/749; 74/89.15
[58] Field of Search ............... 414/744 R, 744 A, 735, 414/749, 1–8; 74/89.15

[56] References Cited

U.S. PATENT DOCUMENTS

| | | | |
|---|---|---|---|
| 3,543,947 | 12/1970 | Devol | 414/744 A |
| 3,935,950 | 2/1976 | Burch | 414/744 A |
| 4,128,019 | 12/1978 | Kupka | 74/89.15 X |
| 4,199,996 | 4/1980 | Moriwaki et al. | 74/89.15 |
| 4,392,776 | 7/1983 | Shum | 414/4 X |

FOREIGN PATENT DOCUMENTS 922331  3/1973  Canada ........................... 414/744 R

OTHER PUBLICATIONS

Fanuc Robot M–Model 3 Maintenance Manual, Contents, pp. 145–149, Apr. 1982.

*Primary Examiner*—Robert J. Spar
*Assistant Examiner*—Donald W. Underwood
*Attorney, Agent, or Firm*—Armstrong, Nikaido, Marmelstein & Kubovcik

[57] ABSTRACT

An industrial robot having a robot hand attached to a robot arm, a rotary motion unit supporting therein the robot arm, a vertical motion unit on which the rotary motion unit is disposed, and a vertical hollow structure extending through the vertical and rotary motion units and defining therein a vertically extending wiring and piping space.

4 Claims, 2 Drawing Figures

INDUSTRIAL ROBOT

BACKGROUND OF THE INVENTION

The present invention relates to an industrial robot and in particular to an improvement in the construction of an industrial robot of the type wherein a rotary motion unit of a robot motion assembly supporting a robot arm and a robot hand is arranged on a vertical motion unit of the robot movable assembly.

A conventional industrial robot of the above-described type is provided with, as illustrated in FIG. 1, a vertical feed mechanism mounted on a robot base 10 and adapted to drive a robot motion assembly having a robot hand 30 vertically along a vertical guide 12 extending upward from the robot base 10. The robot motion assembly comprises a rotation drive means 16 including therein a rotation drive mechanism, a rotation drive motor 18, a bearing box 20, a robot housing 22 mounted on the bearing box 20, a drive motor 24 attached to the robot housing 22 for driving the extending and retracting of a horizontal robot arm 26 extending transversely from the robot housing 22, a robot wrist 28 attached to an outer end of the horizontal robot arm 26, a robot hand 30 attached to a free end of the robot wrist 28, and a wrist-rotating drive motor 32. Thus, the conventional industrial robot has an arrangement in which a rotary motion unit having a vertically extending rotating axis is disposed on a vertical motion unit having a vertical motion axis and a robot arm extending and retracting mechanism for extending and retracting the robot arm 26 is disposed in the rotary motion unit. Reference numeral 14 designates the rod of a load-compensating cylinder provided within the robot base 10 for reducing the load applied to the vertical feed mechanism by counterbalancing a downward load produced by the weights of the rotation drive mechanism, the robot arm extending and retracting mechanism, and the workpiece gripped by the robot hand 30. In the industrial robot having the above-mentioned arrangement, it is conventional to arrange electric wiring related to the rotation drive means 16, electric wiring extending to the robot arm extending and retracting mechanism via the rotation drive means 16, and piping for supplying a working fluid, such as pressurized air, to the robot hand 30 around the exterior of the industrial robot. Accordingly, it is necessary to provide electric wiring and piping of sufficient lengths and to arrange these electric wiring and piping with the help of particular retaining and holding members, such as stainless steel strips and clamping elements, in order to permit the unobstructed rotating motion of the rotary motion unit when the rotation drive means is operated. Furthermore, as the electric wiring and piping are exposed to the exterior of the industrial robot, these wiring and piping spoil the external appearance of the robot and, in addition, are liable to be damaged to such an extent that the reliability of the industrial robot is lowered.

SUMMARY OF THE INVENTION

An object of the present invention is therefore to provide an industrial robot having an improved structure capable of overcoming the disadvantages of the conventional industrial robot in respect to the electric wiring and piping.

Another object of the present invention is to provide an industrial robot having such a construction that the arranging of the electric wiring and piping during the assembling of the industrial robot is made easier as well as less expensive due to the use of a minimum amount of members and materials and the reliability of the robot is enhanced.

In accordance with the present invention, an industrial robot having a robot hand attached to a horizontal robot arm by means of a robot wrist comprises a stationary robot base formed as the lowermost element of the industrial robot, a vertical motion unit arranged on the stationary robot base and including a vertical feed mechanism and a vertical guide fixedly standing on the robot base, a rotary motion unit mounted on the vertical motion unit and including therein a rotation drive mechanism, housing means mounted on the rotary motion unit for supporting therein the horizontal arm, and hollow structure means vertically extending through the vertical motion unit and the rotary motion unit for defining therein a vertical cavity formed as a wiring and piping space.

BRIEF DESCRIPTION OF THE DRAWINGS

The present invention will be more apparent from the following description of a preferred embodiment thereof with reference to the accompanying drawings wherein.

DESCRIPTION OF A PREFERRED EMBODIMENT

Figure 2:
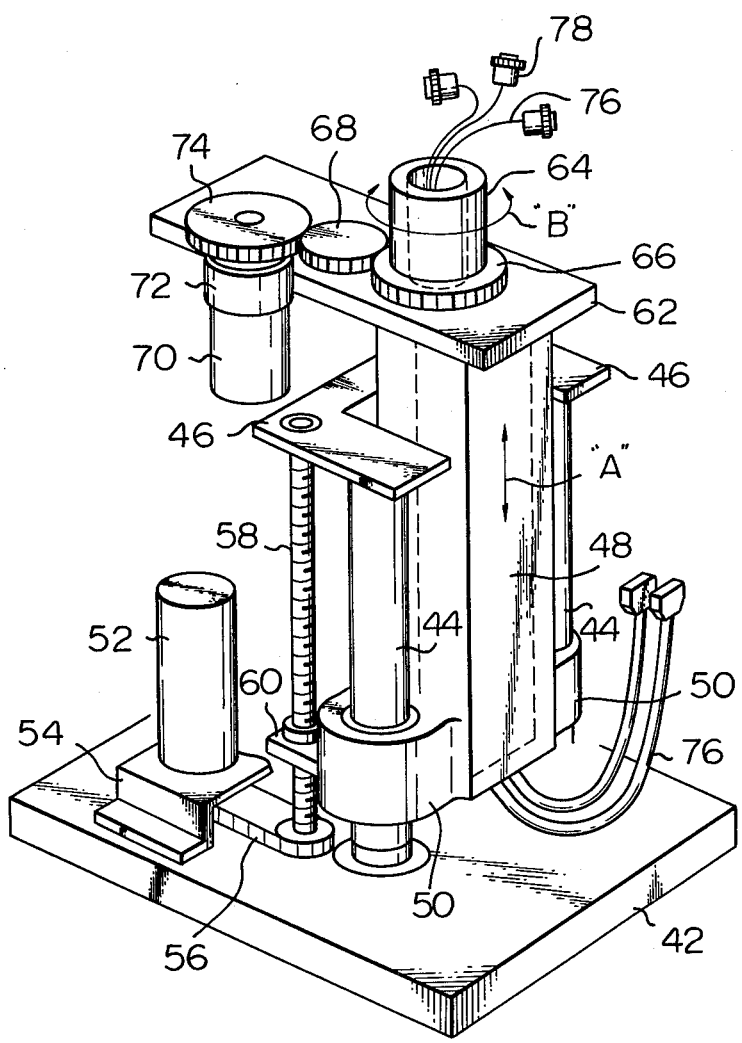
FIG. 2 is a perspective view of an essential part of an industrial robot similar to that of FIG. 1 but equipped with a hollow structure means, according to the present invention. The robot housing 22 and associated elements are removed for better clarity.

Referring to FIG. 2, two vertical guides 44 are fixed to a robot base 42, which is the lowermost element of the industrial robot according to the present invention. A plate 46 is fixed to the respective upper ends of the two vertical guides 44. A hollow frame member 48 formed as the movable part of the vertical motion unit of the robot is arranged so that it is guided up and down by the two guides 44. That is, the slides 50 on the outside of the hollow frame member 48 are fitted on the vertical guides 44. The hollow frame member 48 is in the shape of a box-like member having a cavity vertically extending through the interior of the box-like member. The cavity of the hollow frame member 48 is provided so as to be used as a wiring and piping space. The vertical motion unit is provided with a drive motor 52 which is fixed to the robot base 42 by means of a bracket 54. The drive motor 52 drives, by means of a belt-and-pulley mechanism 56, a vertical feed screw 58 which is rotatably supported between the robot base 42 and the plate 46. That is, the feed screw 58 rotates about its own vertical axis when driven by the drive motor 52. The drive motor 52 per se is operated by a robot controller (not illustrated in FIG. 2). The vertical feed screw 58 is engaged in a thread-like fashion with an interlocking member 60 having an internal screw thread and projecting from one of the slides 50 in the exterior of the hollow frame member 48. Thus, the hollow frame member 48 of the vertical motion unit is moved up and down along the vertical guides 44 in the direction indicated by the double-headed arrow "A" while the feed screw 58 is rotated by the drive motor 52 since the vertical feed action of the feed screw 58 works on the interlocking member 60. An upper support plate 62 for supporting a rotary motion unit is fixed to the hollow frame member 48 at the upper end thereof. A tubular member 64 is rotatably mounted on the upper support plate 62 by means of a suitable rotary bearing means for rotation in the direction indicated by the double-headed arrow "B". The tubular member 64 is disposed so as to be substantially in alignment with the hollow frame member 48 of the vertical motion unit. Therefore, the tubular member 64 has therein a through-bore which is interconnected, via the bore of the upper plate 62, with and is substantially coaxial with the vertically extending cavity of the hollow frame member 48. A gear element 66 is mounted on the rotatable tubular member 64 at a lower part thereof and is engaged with an intermediate gear 68 which is also engaged with a pinion 74 attached to the output shaft of the rotation drive means consisting of a drive motor 70 and a reduction gear 72. It should, however, be noted that the intermediate gear 68 is not an indispensable member and can be omitted. From FIG. 2, it will now be understood that the hollow frame member 48 and the tubular member 64 form a vertical hollow structure in the industrial robot.

Figure 1:
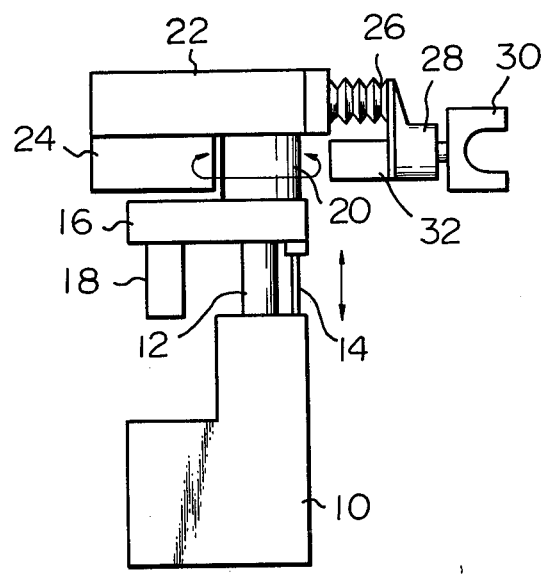
FIG. 1 is a schematic front view of a conventional industrial robot of the type wherein a rotary motion unit of a robot motion assembly supporting a robot arm and a robot hand is arranged on a vertical motion unit of the robot movable assembly.

The transverse extending and retracting mechanism is not illustrated in FIG. 2. However, it comprises a robot housing, a robot arm, a robot wrist, and a robot hand and is mounted on the rotatable tubular member 64 of the rotary motion unit at the upper end thereof in a manner similar to that in the conventional industrial robot illustrated in FIG. 1. From the foregoing description of the embodiment of FIG. 2, it will be understood that according to the present invention, a hollow structure formed by the hollow frame member 48 of the vertical motion unit disposed on the robot base 42 and the rotatable tubular member 64 of the rotary motion unit disposed on the vertical motion unit provides therein a wiring and piping space. More specifically, the arrangement of electrical wiring cables 76 and piping for the distribution of a working fluid through the wiring and piping space from the lower part to the upper part thereof enables all wiring and piping to be eliminated from around the exterior of the industrial robot, and at the same time, the possibility of the wiring cables 76 and the piping being damaged as a result of interference from outside machines and equipment arranged around the industrial robot is eliminated. Furthermore, the external appearance of the industrial robot is improved. At this stage, it should be understood that in the case where the electrical wiring cables 76 are electrically connected to the wiring arranged in the transverse extending and retracting mechanism by means of connecting plugs 78 at a position above the tubular member 64, any twisting of the wiring cables 76 due to the rotation of the rotary motion unit is limited to the lowest degree if the electrical wiring cables 76 are arranged so as to run along the axis of rotation of the tubular member 64 within the wiring and piping space of the member 64. It should be noted that the piping is not connected directly to the rotary motion unit since it is arranged through the wiring and piping space so as to supply a working fluid, such as pressurized air, to the robot hand. Therefore, the piping is not subjected to twisting which occurs in the wiring cables 76.

As described hereinbefore, the arrangement of the wiring and piping through the wiring and piping space defined in the hollow structure of the present invention allows the omission of special holding or clamping members employed in the conventional industrial robot for providing suitable surplus lengths for the electrical wiring cables and the piping, simplifies the wiring and piping operation during the assembling of an industrial robot, and reduces the cost of the industrial robot.

We claim:

1. An industrial robot having a stationary robot base, a vertical motion unit mounted on said robot base, a rotary motion unit mounted on said vertical motion unit, and a robot hand attached to a horizontal robot arm by means of a robot wrist forming part of said rotary motion unit, and having a hollow structure defining a vertical cavity formed as a wiring and piping space comprising:

vertical guides and a vertical feed mechanism mounted on said stationary robot base;

a hollow frame member forming the body of said vertical motion unit and extending vertically from immediately above said stationary robot base, said hollow frame member having formed externally thereon slides fitted on said vertical guides and a projecting interlocking member engaged with said vertical feed mechanism for imparting vertical motion; and an upper support plate fixed to the upper end of said hollow frame member and having rotatably mounted thereon a tubular member supporting thereon said rotary motion unit, said tubular member being disposed so as to be substantially in alignment with said hollow frame member, whereby said hollow frame member and said tubular member form a hollow vertical structure extending from said stationary robot base up into said rotary motion unit.

2. An industrial robot as set forth in claim 1, wherein said tubular member forms a driven element of said rotary motion unit.

3. An industrial robot as set forth in claim 2, further comprising a rotation drive mechanism for said rotary motion unit supported on said upper support plate.

4. An industrial robot as set forth in claim 3, further comprising electrical wiring cables extending from a position adjacent said stationary robot base, through said hollow frame member and said tubular member, into said rotary motion unit.

* * * * *